United States Patent
Slaoui et al.

(10) Patent No.: US 11,052,968 B2
(45) Date of Patent: Jul. 6, 2021

(54) ELECTRIC BICYCLE

(71) Applicant: Cowboy SA, Brussels (BE)

(72) Inventors: Karim Slaoui, Ixelles (BE); Adrien Roose, Forest (BE); Tanguy Goretti, Laeken (BE)

(73) Assignee: Cowboy SA

( * ) Notice: Subject to any disclaimer, the term of this patent is extended or adjusted under 35 U.S.C. 154(b) by 285 days.

(21) Appl. No.: 16/359,946

(22) Filed: Mar. 20, 2019

(65) Prior Publication Data

US 2019/0291810 A1    Sep. 26, 2019

(30) Foreign Application Priority Data

Mar. 20, 2018 (BE) .................................. 2018/5188

(51) Int. Cl.
   *B62M 6/90* (2010.01)
   *B62M 6/40* (2010.01)
   *B62K 19/40* (2006.01)

(52) U.S. Cl.
   CPC ............... *B62M 6/90* (2013.01); *B62M 6/40* (2013.01); *B62K 19/40* (2013.01)

(58) Field of Classification Search
   None
   See application file for complete search history.

(56) References Cited

U.S. PATENT DOCUMENTS

| | | | |
|---|---|---|---|
| 2016/0311494 A1* | 10/2016 | Schliewert | B62K 19/30 |
| 2017/0096190 A1 | 4/2017 | Yu et al. | |
| 2019/0165347 A1* | 5/2019 | Trit | H01M 50/20 |

FOREIGN PATENT DOCUMENTS

| | | | |
|---|---|---|---|
| CN | 201 856 877 U | 6/2011 | |
| CN | 205 059 925 U | 3/2016 | |
| CN | 210822592 U * | 6/2020 | |
| EP | 0 262 487 A1 | 4/1988 | |
| JP | 10181651 A * | 7/1998 | B62M 6/90 |
| JP | 2005 080490 A | 3/2005 | |
| JP | 2012 176714 A | 9/2012 | |
| WO | WO 2015/011646 | 1/2015 | |

OTHER PUBLICATIONS

Search Report dated Nov. 9, 2018.

* cited by examiner

*Primary Examiner* — Kevin Hurley
(74) *Attorney, Agent, or Firm* — Fresh IP PLC; Clifford D. Hyra; Aubrey Y. Chen

(57) ABSTRACT

An electric bicycle comprises a removable battery pack (1) for storing electrical energy, and a frame element (5) to which the battery pack (1) is intended to be fixed. The battery pack comprises a housing and a lock arranged in said housing and the frame element (5) comprises a projecting locking element (21), said locking element (21) penetrating into the housing of the battery pack (1) through an entry opening so as to co-operate with said lock with a view to fixing said battery pack (1) to said frame element (5).

19 Claims, 2 Drawing Sheets

ELECTRIC BICYCLE

This application claims the benefit of Belgian patent application BE201805188, filed on Mar. 20, 2018, which is hereby incorporated by reference herein in its entirety.

FIELD OF THE DISCLOSURE

The invention lies in the field of electric bicycles, particularly systems for fixing a battery into a frame element of an electric bicycle. The invention therefore relates to a battery pack, a frame element capable of accommodating such a battery and a bicycle comprising the two elements.

BACKGROUND

An electric bicycle, also known as an electrically assisted bicycle, is a bicycle equipped with an ancillary electric motor and a rechargeable battery. The function of the motor is to supplement pedalling. In the vast majority of cases, electric bicycles are provided with a removable rechargeable battery. This offers several advantages, such as the possibility of recharging the battery away from the bicycle, replacing it at the end of its life, or preventing theft.

It is therefore desirable to find a system for fixing the battery into the bicycle frame so that it is easy to fit and remove, and so that it can be fitted in a way that does not restrict the mobility of the user when pedalling. Furthermore, for reasons of style and comfort, it is useful for the battery to be as invisible as possible, and light, so as not to make the bicycle too heavy.

It is known that a battery or a set of batteries can be mounted in or on the frame of bicycles. The document EP1982909 describes an electric bicycle comprising a battery provided with a cap. The cap is fixed to an upper portion of the battery and is capable of co-operating with a view to being fixed into an engaging frame of a bicycle, the frame being located in a tube extending between the head tube and the seat tube. Nevertheless, such a solution has the disadvantage of requiring the presence of additional parts, such as the cap and the engaging frame. A simpler solution is yet to be found.

The document DE202013008187 proposes an assembly comprising a battery pack and a frame element, the frame element comprises an impression cut out of a flat surface to accommodate said battery pack. The battery pack has a handle for manipulation. A latch is provided in the bicycle frame for fixing said battery pack. It would be useful, however, to do without the presence of obvious fixing means, for example on the visible interfaces between the battery pack and the bicycle frame.

The document WO2017028837 proposes a bicycle comprising a battery pack and a down tube, the fixing means of which, after fitting, are not obvious to the naked eye. In this case, mounting the battery pack in the down tube relies on the shapes of these two parts being complementary at their upper and lower ends, the shape of the frame element being specially designed to accommodate the battery pack. The frame has a battery pack lock. Nevertheless, the presence of such locking systems in the frame of the bicycle makes it more complex to produce and therefore increases its costs.

The document EP2409907 also describes an assembly comprising a battery pack and a frame element, said frame element comprising a U-shaped recess. The battery pack therefore has a complementary shape intended to be accommodated in said element. Aesthetically, the assembly does not comprise any obvious fixing means. This configuration is not, however, advantageous in that a large part of the battery pack body is located outside said recess, which could lead to said battery pack being dislodged when there is a sudden manoeuvre.

SUMMARY

The purpose of the invention is to provide a response to at least one of the drawbacks encountered in the prior art by proposing an electric bicycle comprising a removable battery pack configured so as to allow said battery pack to be mounted easily and locked reliably, with no risk of being dislodged. One of the purposes of the invention is also to propose an electric bicycle with a simple, economical design, which has an attractive appearance in that the means for fixing said battery pack are not obvious.

To this end and according to a first aspect, the invention relates to an electric bicycle comprising a removable battery pack for storing electrical energy, and a frame element to which the battery pack is intended to be fixed, the bicycle being remarkable in that the battery pack comprises a housing and a lock arranged in said housing and in that the frame element comprises a projecting locking element, said locking element penetrating into the housing of the battery pack through an entry opening so as to co-operate with said lock with a view to fixing said battery pack to said frame element.

As will have been understood on reading the definition that has just been given, the invention proposes a bicycle in which the moveable parts of the battery pack lock are positioned within the battery pack and not on the frame. The invention thereby simplifies the design of the bicycle frame and therefore reduces its production costs. Furthermore, by proposing that the locking element on the frame penetrates into the battery pack in order to fix said battery pack, the invention will mask the locking interface between the frame and the battery pack, thus responding to the aesthetic constraints mentioned above.

According to a preferred embodiment of the invention, the lock of the battery pack comprises a bolt that can be moved between a locked position and a released position, and the projecting locking element takes the form of a tongue having a free end, and having a cut-out at its free end so as to form a striker intended to co-operate with said bolt when it is in the locked position. The moveable elements for fixing the battery pack to the frame element are therefore located within the battery pack.

Advantageously, the bolt is associated with an elastic element, and the elastic element is arranged so as to return the bolt to its locked position. Preferably, the bolt has a bevelled shape configured so as to co-operate with the end of the locking element, to allow said bolt to penetrate into said cut-out of the locking element when the locking element is pushed into the housing of the battery pack.

This configuration is advantageous in that it allows the battery pack to be locked to the frame element passively, by simply positioning the battery pack on said frame.

Preferably, the lock comprises a latch, or a key-type or combination lock, configured so as to move the bolt from its locked position to its released position. In this configuration, it is not possible to dislodge the battery pack without active intervention by the user. When there is a lock on the battery pack, it offers an additional safety device by preventing said battery pack from being stolen.

According to a preferred embodiment, the housing also has an elastic element arranged:

so as to be compressed when the locking element is inserted into said housing and co-operates with the bolt placed in the locked position, and so as to exert pressure on said locking element with a view to ejecting it at least partly from said housing when the bolt is placed in the released position;

Preferably, the elastic element is made of silicon.

The invention is remarkable in that simply releasing the bolt allows the locking element to be pushed at least partly out of the housing, thus preventing the bolt from being re-engaged in the locking element. Furthermore, the presence of an elastic element bearing against the locking element makes it possible to dampen the vibrations arising when the bicycle is ridden and therefore increases the lifetime of the battery pack, while reducing the noise that may be generated by such vibrations.

Optionally, the entry opening of the housing has a shutter that can be moved between a position where the entry opening is clear and a position where said entry opening is blocked by pivoting inwards into the housing. Preferably, said shutter is associated with an elastic return element, returning it to the blocked position. This configuration has an aesthetic advantage and increases the quality of the battery pack as perceived by the user. It also makes it possible to avoid small objects getting into the battery pack housing, which objects might interfere with the lock, when the battery pack is not mounted on the frame element.

According to a variant of the invention, the battery pack further comprises an indicator lamp and/or a cataphote-type reflector. Preferably, the bicycle is configured so that the indicator lamp is supplied with electrical energy by the battery pack. This configuration is advantageous in that it gives the battery pack a dual function of energy storage and indicator lamp.

Advantageously, the frame element comprises a gutter-shaped profile, the cavity of which is intended to accommodate the battery pack and the locking element of which is positioned at the bottom of said cavity. Preferably, the frame element is a seat tube and said profile is open towards the rear of said bicycle.

Advantageously, the locking element is fixed to the frame element by screwing. This configuration further simplifies the design and production of the bicycle and reduces its production cost.

Preferably, the bicycle comprises an electric motor and is remarkable in that the battery pack comprises electrical connection means capable of co-operating with an item of electrical equipment located on the bicycle frame, to transmit power from said battery pack and supply the electric motor. Preferably, the battery pack has an elongated shape comprising two opposite ends, the electrical connection means are arranged at one of the ends of the battery pack and the lock at the opposite end of the battery pack.

According to a second aspect, the subject-matter of the invention is a battery pack for storing electrical energy, intended to be mounted on an electric bicycle according to the first aspect, the battery pack being remarkable in that it comprises a housing in which a lock is arranged, said housing having an entry opening, the lock of the battery pack comprising a bolt that can be moved between a locked position and a released position and is intended to co-operate with a locking element positioned on a frame element of said bicycle with a view to fixing said battery pack to said frame element.

According to a preferred embodiment, the bolt is associated with an elastic element, and the elastic element is arranged so as to return the bolt to its locked position. Preferably, the bolt is bevelled in shape. Advantageously, the bolt is moved into its released position by means of a latch or by means of a key-type or combination lock.

According to a preferred embodiment, the housing also has an elastic element arranged so as to be compressed when the locking element is inserted into said housing and co-operates with the bolt placed in the locked position, and so as to exert pressure on said locking element with a view to ejecting it at least partly from said housing when the bolt is placed in the released position;

Preferably, the elastic element is made of silicon.

Optionally, said entry opening has a shutter that can be moved between a position where the entry opening is clear and a position where said entry opening is blocked by pivoting inwards into the housing. Preferably, said shutter is associated with an elastic return element, returning it to the blocked position.

Ideally, the battery pack further comprises an indicator lamp and/or a cataphote-type reflector. Preferably, the bicycle is configured so that the indicator lamp is supplied with electrical energy by the battery pack.

According to a third aspect, the invention concerns a bicycle frame for an electric bicycle according to the first aspect, remarkable in that it comprises a frame element having a projecting locking element intended to co-operate with the lock of a battery pack according to the second aspect, and in that the locking element is shaped like a tongue having a cut-out at its end so as to form a striker, preferably:

the frame element comprises a gutter-shaped profile, the cavity of which is intended to accommodate the battery pack and in that the locking element is positioned at the bottom of said cavity; and/or the bicycle frame element is a seat tube and said profile is open towards the rear of said bicycle; and/or said locking element is fixed to the frame element by screwing.

BRIEF DESCRIPTION OF THE DRAWINGS

It will be easy to understand the invention and other aspects and advantages will become clearly apparent on seeing the following description given with reference to the accompanying drawings in which.

DETAILED DESCRIPTION

Figure 1:
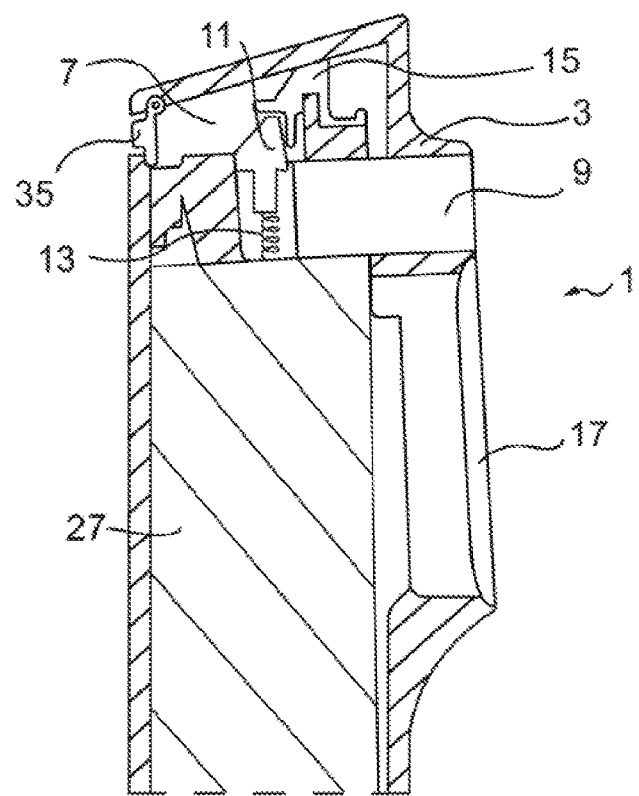
FIG. 1 is a partial schematic illustration in a longitudinal section of a battery pack according to the invention.

In the following description, the term "comprise" is synonymous with "include" and is not restrictive in that it allows for the presence of other elements in the bicycle, the battery pack or the frame to which it refers. It is understood that the term "comprise" includes the terms "consist of". The terms "front" and "rear" are to be understood in relation to the general orientation of the bicycle. In the various figures, the same reference numerals denote identical or similar elements.

The invention relates to an electric bicycle comprising a removable battery pack for storing electrical energy, and a frame element to which the battery pack is intended to be fixed. The battery pack 1 is shown partially in FIG. 1, in a longitudinal section. The battery pack 1 represents the electrical power source of the bicycle. It is of interest, therefore, for it to be mounted removably on the bicycle frame to allow it to be recharged by an external electrical power source. The battery pack 1 advantageously has a good performance/weight ratio. For example, it corresponds to a plurality of lithium-based energy storage elements 27.

Figure 2:
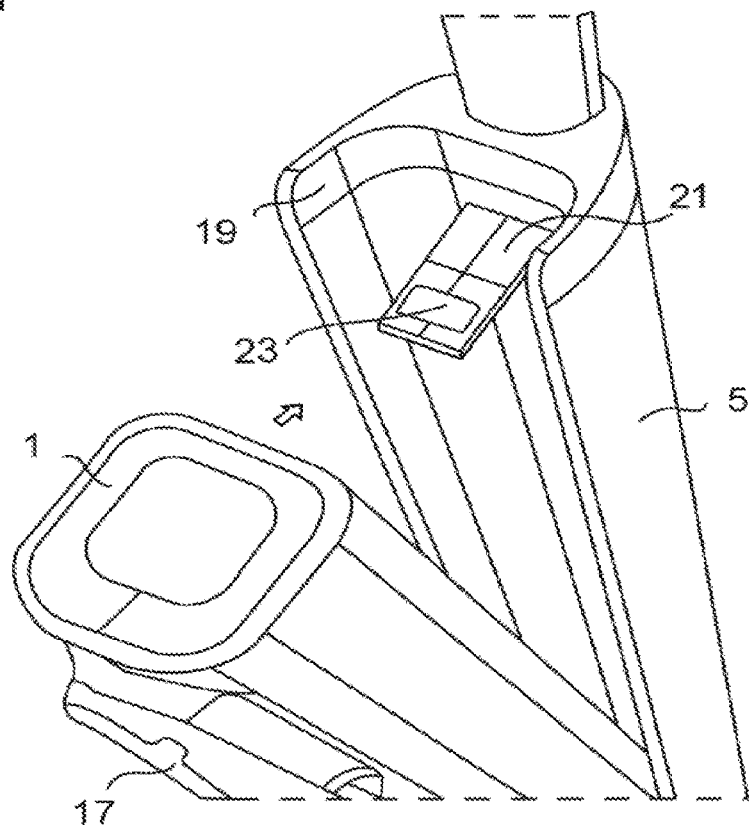
FIG. 2 illustrates the arrangement of a battery pack and a frame element when the battery pack is fixed to said frame element.

According to a preferred embodiment of the invention, the battery pack 1 comprises a body 3 comprising the energy storage elements 27, a housing 7 and a lock arranged in said housing and intended to co-operate with a locking element 21 (visible in FIGS. 2 and 3) positioned on a frame element 5 (visible in FIGS. 2 and 3) of said bicycle, with a view to fixing said battery pack 1 to said frame element 5. Fixing takes place by the locking element 21 penetrating into said housing 7 with a view to its co-operation with the lock. As can be seen in FIG. 2, the locking element 21 advantageously takes the form of a tongue comprising a cut-out 23 at its free end so as to form a striker. Advantageously, the locking element 21 is fixed to the frame element 5 by screwing, but the person skilled in the art may envisage other types of fixing, for example by welding, clipping or gluing. It is also possible for it to be made in one piece with the frame element 5. According to a preferred embodiment of the invention, the locking element 21 is screwed to the frame element 5. This assembly method is particularly advantageous because it is repeatable and ensures a degree of tolerance in that it allows the position of the fixing means 21 on said frame element 5 to be adjusted.

According to a preferred embodiment of the invention, the lock of the battery pack comprises a bolt 11 that can be moved between a locked position and a released position. In the locked position, the bolt 11 penetrates into the cut-out 23 of the locking element 21 so as to fix the battery pack in position on the frame element 5. In the released position, the bolt 11 is released from the cut-out 23 of the locking element 21 thus permitting translation movement of the locking element 21 in the housing 7 with a view to removing the battery pack 1.

Advantageously, the bolt 11 is associated with an elastic element 13, for example a spring. According to the invention, the elastic element 13 are arranged so as to return the bolt 11 to its locked position. At rest, the bolt 11 is therefore in the locked position; it advantageously has a bevelled shape with a bevelled face configured so as to co-operate with the free end of the locking element 21 when said locking element 21 is pushed into the housing 7. The bolt 11 is then gradually moved into the released position so as to return to the locked position when the cut-out 23 of the locking element 21 is aligned with the free end of the bolt 11. The battery pack is then fixed to the frame element 5.

While the fixing of the battery pack takes place passively, its release will preferably require an active step on the part of the bicycle user. Preferably, therefore, the bolt 11 is moved into its released position by means of a latch or by means of a key-type or combination lock 9. The means of co-operation between the bolt and the lock are not shown in FIG. 1, but are well known to the person skilled in the art, preferably by means of a lock 9. The means of actuating the latch or the lock are therefore positioned on one of the visible faces of the battery pack when the latter is fixed to the frame element 5. For example, they are arranged on the face of the battery pack 1 opposite the one having the opening of the housing 7 through which the projecting locking element 21 is inserted.

According to a preferred embodiment, the housing 7 also has an elastic element 15 arranged at the bottom of the housing 7 so as to be positioned facing the entry opening of the housing 7 through which the locking element 21 penetrates. The elastic element 15 is fixed in position in the housing 7. The locking element 21 is thereby placed abutting against said elastic element 15 when it is inserted into the housing 7 and compresses said elastic element 15.

In some examples, the elastic element is an element made of elastomeric material chosen from silicones, ethylene propylene diene terpolymers (EPDM), thermoplastic elastomers (TPE), styrene-butadiene (SBR) copolymers or latexes. In some examples, the elastic element is made of silicon.

Compression of the elastic element may be associated with deformation of at least a portion thereof by said portion being pushed into an empty space positioned behind said portion of the elastic element 15 in the direction in which the locking element 21 is pushed, as illustrated in FIG. 1.

The presence of an elastic element 15 in the housing 7 of the battery pack 1 has two main benefits. A first benefit is to reduce the vibrations arising when the bicycle is ridden and therefore the noise and wear that might result therefrom. Furthermore, the elastic element will make it easier to unlatch the battery pack 1 by exerting pressure on the free end of said locking element 21 with a view to ejecting it at least partly from said housing 7 when the bolt 11 is placed in the released position by actuating a lock 9 or a latch. It will be understood that when the bolt 11 is brought into the released position, the elastic element 15 will exert pressure on the free end of the locking element 21 so that its cut-out 23 is no longer aligned with the bolt 11. When the user releases the lock or the latch, the bolt 11 is returned to its locked position by the elastic element 13, but it is no longer engaged in the cut-out 23 of the locking element. The bevelled face of the bolt 11 will contribute to pushing the locking element 21 even further out of the housing 7. This will have the effect of tilting the battery pack 1 in the profile 19 accommodating it at one of its ends, thus making it easy for the user to grip it.

Optionally, the entry opening of the housing 7 has a shutter 35 that can be moved between a position where the entry opening is clear and a position where said entry opening is blocked by pivoting inwards into the housing 7. Said shutter 35 is preferably associated with an elastic return element, returning it to the blocked position. This means that the shutter moves inwards into the housing 7 when the battery pack 1 is mounted in the frame element 5 and it returns to its initial position when the two parts (1, 5) are disassembled.

According to a variant of the invention, the battery pack further comprises an indicator lamp 17 and/or a cataphote-type reflector. Preferably, the bicycle is configured so that the indicator lamp 17 is supplied with electrical energy by the battery pack. This configuration means that the battery pack 1 is installed in the seat tube. This is particularly advantageous since, on the one hand, there is no need to add an additional part to the bicycle frame in order to fit said lamp, thus making it possible to produce a frame with a lighter total weight and, on the other hand, the proximity of the lamp 17 and the energy storage elements 27 avoids using additional cables to supply it with electrical energy.

Figure 3:
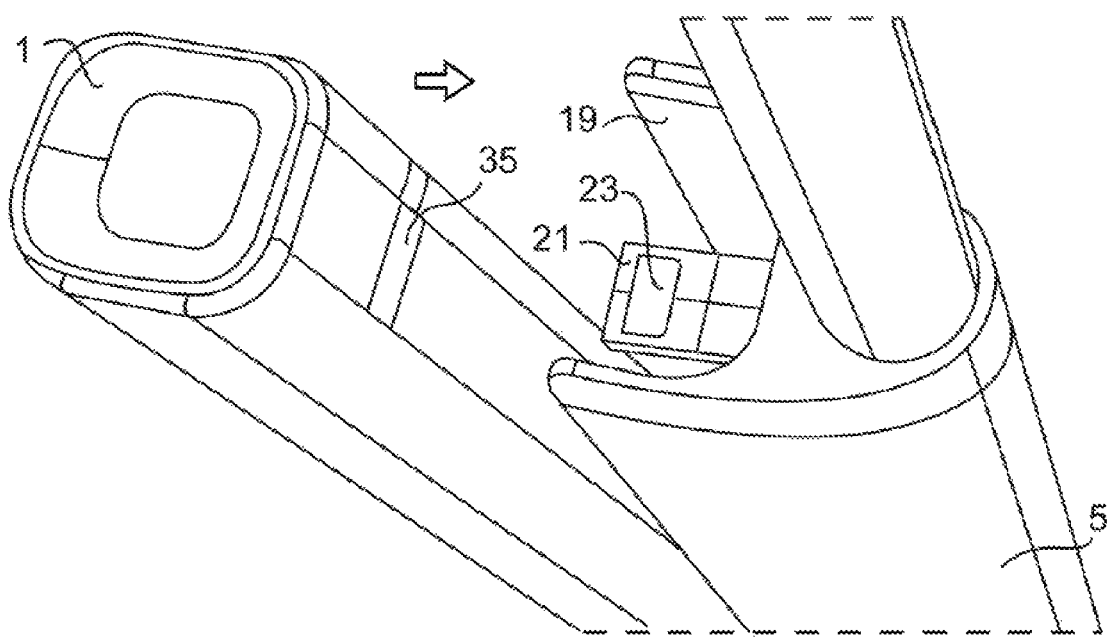
FIG. 3 is a view similar to FIG. 2 from another point of view.
Figure 4:
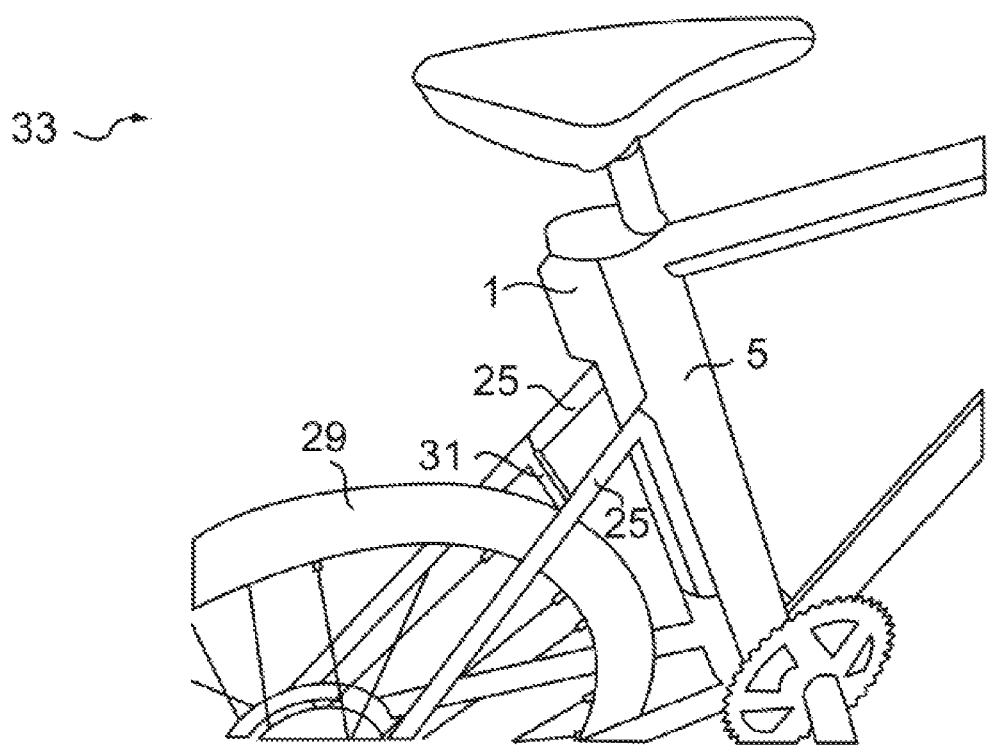
FIG. 4 is a view of the rear portion of an electric bicycle according to the invention comprising a battery pack fixed to the seat tube.

Advantageously, as illustrated in FIGS. 2 and 3, the bicycle frame element 5 comprises a gutter-shaped profile 19, the cavity of which is intended to accommodate the battery pack and the locking element 21 of which is positioned at the bottom of said cavity. Preferably, as illustrated in FIG. 4, the frame element 5 of a bicycle 33 is the seat tube and said profile 19 is open towards the rear of said bicycle 33. Advantageously, when the frame element 5 is a seat tube, the profile 19 is located in a direction parallel to the seat post mounted removably or otherwise in said tube. This configuration allows the seat tube to have a dual function: to accommodate the seat post and the battery pack.

In our exemplary embodiment, the frame element 5 is the seat tube, but a choice can be made between the seat tube, the cross-bar, the down tube or the head tube. Preferably, the frame element 5 is a seat tube produced by extrusion. This particular configuration is of interest because, in the vast majority of bicycles, the seat tube can be connected to the hub by means of two seat stays 25 in the longitudinal direction of the bicycle, the two seat stays 25 being connected together in turn by a linking rod. This linking rod 31 is located between the seat tube and the rear wheel 29 of the bicycle 33, which gives additional protection for the battery pack 1. When being disassembled, after it is ejected from the seat tube, the battery pack 1 is held in place by said linking rod 31. There is therefore no risk of the battery pack 1 falling to the ground and being damaged.

Preferably, the battery pack 1 comprises electrical connection means (not shown) capable of co-operating with an item of electrical equipment located on the bicycle frame, to transmit power from said battery pack and supply the electric motor. Preferably, the battery pack 1 has an elongated shape comprising two opposite ends, the electrical connection means are arranged at one of the ends of the battery pack and the lock at the opposite end of the battery pack.

As will be understood, the battery pack 1 is mounted in the frame element 5 as follows: said battery pack 1 is placed in the profile 19 by positioning the end comprising the electrical connection means against the complementary connection means carried by the frame element 5. The battery pack 1 is then pivoted towards the bottom of the gutter formed by the profile, so that the locking element 21 is positioned facing the entry opening of the housing and then penetrates it.

The battery pack 1 is disassembled as follows. The user actuates the lock 9, for example by using a key. The spring 13 is then compressed, the bolt 11 will be moved into the casing 9, the elastic element 15 releases the stored force and pushes the locking element 21 at least partly out of the housing 7, thus making it easy for the user to grasp the battery pack 1, since said battery pack is tilted and partly comes out of the gutter in which it is accommodated.

The invention claimed is:

1. An electric bicycle, comprising:
a removable battery pack for storing electrical energy, and
a frame element to which the battery pack is intended to be fixed,
wherein the battery pack comprises a housing and a lock arranged in said housing,
wherein the frame element comprises a projecting locking element, said locking element adapted to penetrate into the housing of the battery pack through an entry opening so as to co-operate with said lock for fixing said battery pack to said frame element,
wherein the frame element comprises a gutter-shaped profile, a cavity of which is adapted to accommodate the battery pack,
wherein the locking element is positioned at a bottom of said cavity,
wherein the frame element is a seat tube and wherein said profile is open towards a rear of said bicycle.

2. The bicycle according to claim 1, wherein the lock of the battery pack comprises a bolt that can be moved between a locked position and a released position, and the projecting locking element takes the form of a tongue having a free end, and having a cut-out at its free end so as to form a striker adapted to co-operate with said bolt when it is in the locked position.

3. The bicycle according to claim 2, wherein the bolt is associated with an elastic element, and the elastic element is arranged so as to return the bolt to its locked position, the bolt has a bevelled shape configured so as to co-operate with the end of the locking element, to allow said bolt to penetrate into said cut-out of the locking element when the locking element is pushed into the housing of the battery pack.

4. The bicycle according to claim 3, wherein the housing has a second elastic element arranged
so as to be compressed when the locking element is inserted into said housing and co-operates with the bolt placed in the locked position, and
so as to exert pressure on said locking element with a view to ejecting it at least partly from said housing when the bolt is placed in the released position.

5. The bicycle according to claim 2, wherein the lock comprises a latch, or a key-type or combination lock, configured so as to move the bolt from its locked position to its released position.

6. The bicycle according to claim 1, wherein the entry opening of the housing has a shutter that can be moved between a position where the entry opening is clear and a position where said entry opening is blocked by pivoting the shutter inwards into the housing, and said shutter is associated with an elastic return element returning it to the blocked position.

7. The bicycle according to claim 1, wherein the battery pack further comprises an indicator lamp and/or a cataphote-type reflector and the bicycle is configured so that the indicator lamp is supplied with electrical energy by the battery pack.

8. A battery pack for storing electrical energy, adapted to be part of an electric bicycle according to claim 1, wherein the battery pack comprises a housing in which a lock is positioned, said housing having an entry opening, the lock of the battery pack comprising a bolt that can be moved between a locked position and a released position and which is adapted to co-operate with a locking element positioned on a frame element of said bicycle with for fixing said battery pack to said frame element.

9. The battery pack according to claim 8, wherein:
the housing has an entry opening, said opening having a shutter that can be moved between a position where the entry opening is clear and a position where said entry opening is blocked by pivoting inwards into the housing, wherein said shutter is associated with an elastic returner returning it to the blocked position, and/or
the battery pack further comprises an indicator lamp and/or a cataphote-type reflector, wherein the bicycle is configured so that the indicator lamp is supplied with electrical energy by the battery pack.

10. A bicycle frame for an electric bicycle according to claim 1, comprising a frame element having a projecting locking element intended to co-operate with a lock of a battery pack, wherein:

the battery pack, adapted to be part of an electric bicycle according to claim 1, comprises a housing in which a lock is positioned, said housing having an entry opening, the lock of the battery pack comprising a bolt that can be moved between a locked position and a released position and which is adapted to co-operate with a locking element positioned on a frame element of said bicycle for fixing said battery pack to said frame element;

the locking element is shaped like a tongue having a cut-out at its end so as to form a striker;

the frame element comprises a profile shaped as a gutter, a cavity of which is adapted to accommodate the battery pack and the locking element is positioned at a bottom of said cavity; and/or the frame element is a seat tube and said profile is open towards a rear of said bicycle; and/or said locking element is fixed to the frame element by screwing.

11. An electric bicycle, comprising:

a removable battery pack for storing electrical energy, the battery pack comprising a housing and lock arranged in said housing, a frame element to which the battery pack is intended to be fixed, the frame element comprising a projecting locking element, said locking element penetrating into the housing of the battery pack through an entry opening so as to co-operate with said lock for fixing said battery pack to said frame element;

wherein:

the frame element is a seat tube comprising a gutter-shaped profile, a cavity of which is adapted to accommodate the battery pack;

the locking element is positioned at a bottom of said cavity;

an axis of the gutter-shaped profile is parallel to the axis of the seat tube; and said gutter-shaped profile is open towards a rear of said bicycle.

12. The bicycle according to claim 11, wherein the lock of the battery pack comprises a bolt that can be moved between a locked position and a released position, and the projecting locking element takes the form of a tongue having a free end, and having a cut-out at its free end so as to form a striker adapted to co-operate with said bolt when it is in the locked position.

13. The bicycle according to claim 12, wherein the bolt is associated with an elastic element, and the elastic element is arranged so as to return the bolt to its locked position, the bolt has a bevelled shape configured so as to co-operate with the end of the locking element, to allow said bolt to penetrate into said cut-out of the locking element when the locking element is pushed into the housing of the battery pack.

14. The bicycle according to claim 13, wherein the housing has a second elastic element arranged
   so as to be compressed when the locking element is inserted into said housing and co-operates with the bolt placed in the locked position, and
   so as to exert pressure on said locking element with a view to ejecting it at least partly from said housing when the bolt is placed in the released position;
   wherein the elastic element is preferably made of silicon.

15. The bicycle according to claim 12, wherein the lock comprises a latch, or a key-type or combination lock, configured so as to move the bolt from its locked position to its released position.

16. The bicycle according to claim 11, wherein the entry opening of the housing has a shutter that can be moved between a position where the entry opening is clear and a position where said entry opening is blocked by pivoting the shutter inwards into the housing, and said shutter is associated with an elastic return element returning it to the blocked position.

17. The bicycle according to claim 11, wherein the battery pack further comprises an indicator lamp and/or a cataphote-type reflector; and wherein the bicycle is configured so that the indicator lamp is supplied with electrical energy by the battery pack.

18. A battery pack for storing electrical energy, adapted to be part of an electric bicycle according to claim 11, wherein the battery pack comprises a housing in which a lock is positioned, said housing having an entry opening, the lock of the battery pack comprising a bolt that can be moved between a locked position and a released position and which is adapted to co-operate with a locking element positioned on a frame element of said bicycle for fixing said battery pack to said frame element.

19. The battery pack according to claim 18, wherein:
   the housing has an entry opening, said opening having a shutter that can be moved between a position where the entry opening is clear and a position where said entry opening is blocked by pivoting inwards into the housing, and said shutter is associated with an elastic returner returning it to the blocked position, and/or
   the battery pack further comprises an indicator lamp and/or a cataphote-type reflector and the bicycle is configured so that the indicator lamp is supplied with electrical energy by the battery pack.

* * * * *